Patented Jan. 10, 1933

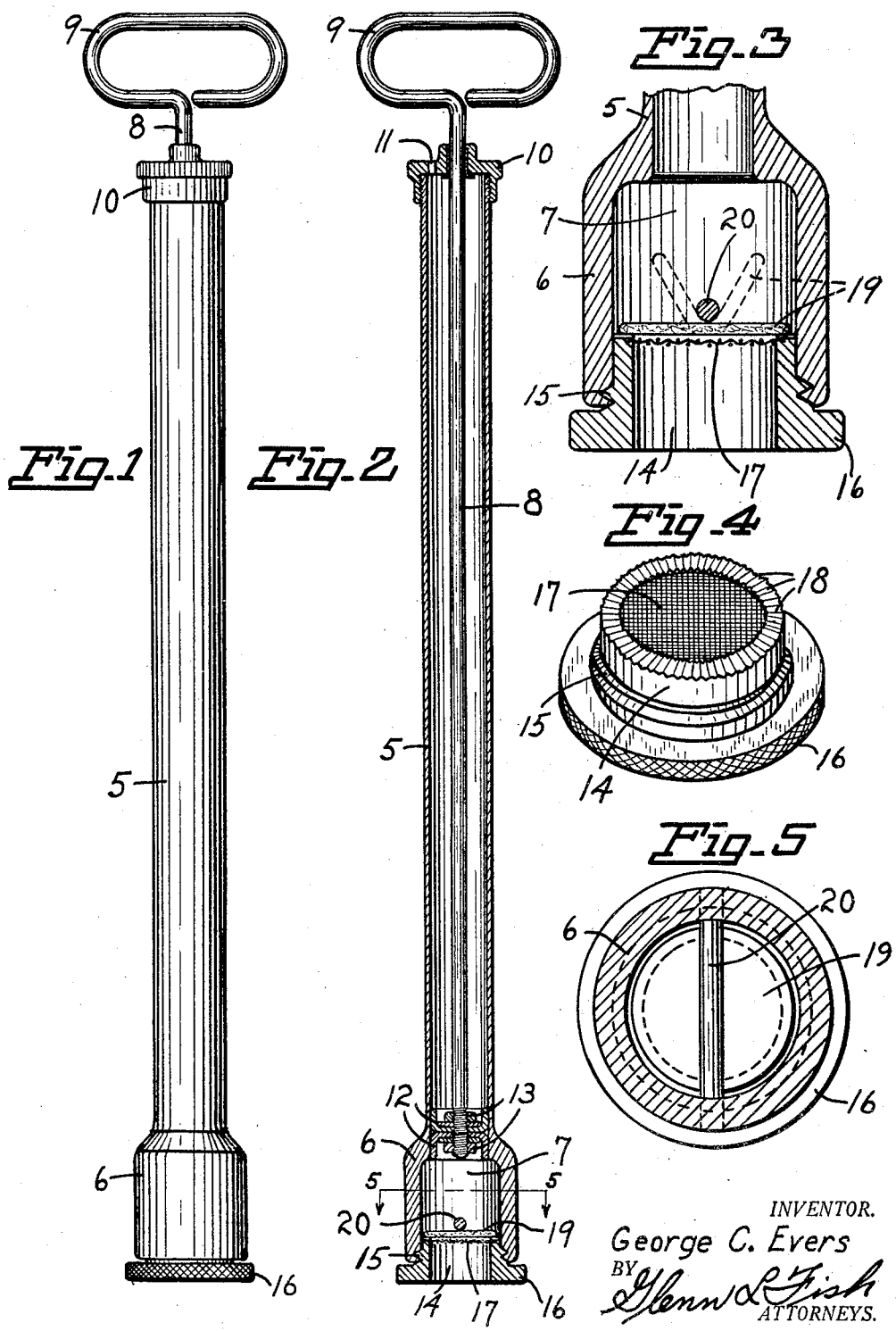

1,893,735

UNITED STATES PATENT OFFICE

GEORGE C. EVERS, OF SPOKANE, WASHINGTON

MILK FILTERING APPARATUS

Application filed June 24, 1929, Serial No. 373,451. Renewed February 20, 1932.

My invention relates to milk testing apparatus and more particularly to an apparatus for testing milk for sediment. Certain objects of the invention are to provide a milk testing apparatus of simple and inexpensive construction and by means of which the total amount of sediment that a given amount of milk carries in suspension may be directly determined.

With the above and other objects in view which will appear as the description proceeds, the invention consists of the novel construction, adaptation, combination and arrangement of parts hereinafter described and claimed. These objects are accomplished by devices illustrated in the accompanying drawing; wherein:—

Figure 1 is a view in elevation of the device;

Fig. 2 is a view in longitudinal section of the same;

Fig. 3 is an enlarged view in vertical section of the intake or discharge end portion of the device;

Fig. 4 is a view in perspective of the bottom screw cap; and

Fig. 5 is a view in transverse section taken on a broken line 5, 5 of Fig. 2.

Referring to the drawing throughout which like reference numerals designate like parts, the numeral 5 indicates a main body tubular member that is enlarged at its lower end portion, as at 6, to form a bottom chamber 7. A plunger rod 8 is disposed within said tubular member and extends substantially the full length thereof to said bottom chamber.

The upper exterior portion of the plunger rod 8 is formed into a handle 9. Said rod passes through a closure cap 10 which is threaded onto the upper end of the tubular member 5 and is provided with an air vent 11. The lower end portion of said plunger rod is provided with the usual double acting flexible suction cups 12 that are preferably made of leather and secured to said rod by jam nuts 13 as will be understood.

A hollow bottom cap 14 that is threaded at 15 and provided with an enlarged lower flange 16 is adapted to be screwed into the bottom chamber 7. A suitable screen 17 is fastened to the top of said cap member and the annular top edge of said member is provided with a plurality of radial grooves or notches 18 as clearly shown in the drawings.

A pad 19 that is preferably made of cotton or felt is adapted to cover the entire top of the cap member 14. A rod or bar 20 is fastened transversely through the chamber 7 in such position that it will be impinged by said pad and thereby serve to retain same in place.

My device is used for testing raw milk when it is brought usually by farmers into the dairy. Assuming that the apparatus is fully assembled as shown in Fig. 2, its lower or suction end is inserted into the milk can and the plunger rod 8 is drawn upwardly. The tubular body 5 will thus be filled with milk and during the suction movement of said rod the pad 19 will assume the position shown in dotted lines in Fig. 3.

Upon forcing the milk from the device by a downward movement of the plunger 8 it will filter through the pad 19 and its content of sediment will be deposited on said pad as will be understood. A new pad is used for each test and the grooves 18 permit the entry of air and thus prevent adhesion so that said pads may be removed without disturbing the sediment thereon.

It will now be apparent that I have provided a simple, inexpensive and efficient means whereby the amount of sediment in milk may be directly determined. Having thus described my invention, it being understood that minor changes may be resorted to in its construction without departing from its scope and spirit, what I claim and desire to secure by Letters Patent of the United States is:—

1. A milk testing apparatus comprising a tubular body having an enlarged lower chamber, a plunger, a screened lower cap member, a filter pad for said member, and a transverse rod adapted to retain said pad in place.

2. A milk testing apparatus comprising a tubular body having an enlarged lower chamber, a plunger, a screened lower cap threadedly installed in the lower end of said lower chamber, said lower cap member having radial grooves in its upper edge, a filter pad adapted to rest on the upper end of said cap member, and a transverse rod adapted to diametrically retain said pad in position.

In testimony whereof I affix my signature.

GEORGE C. EVERS.